(12) United States Patent
Chandramouli et al.

(10) Patent No.: US 10,922,734 B2
(45) Date of Patent: Feb. 16, 2021

(54) AUTOMATIC IDENTIFICATION OF ISSUES IN TEXT-BASED TRANSCRIPTS

(71) Applicant: FMR LLC, Boston, MA (US)

(72) Inventors: Aravind Chandramouli, Bangalore (IN); Ankit Patil, Madhya Pradesh (IN)

(73) Assignee: FMR LLC, Boston, MA (US)

( * ) Notice: Subject to any disclaimer, the term of this patent is extended or adjusted under 35 U.S.C. 154(b) by 931 days.

(21) Appl. No.: 15/457,079

(22) Filed: Mar. 13, 2017

(65) Prior Publication Data
US 2018/0260873 A1 Sep. 13, 2018

(51) Int. Cl.
*G06Q 30/06* (2012.01)
*G06F 16/901* (2019.01)

(52) U.S. Cl.
CPC ....... *G06Q 30/0625* (2013.01); *G06F 16/901* (2019.01)

(58) Field of Classification Search
CPC .......... G06Q 30/0625; G06F 16/901
See application file for complete search history.

(56) References Cited

U.S. PATENT DOCUMENTS

| | | | |
|---|---|---|---|
| 7,725,414 B2 | 5/2010 | Nigam et al. | |
| 8,370,155 B2 | 2/2013 | Byrd et al. | |
| 8,396,741 B2 * | 3/2013 | Kannan | G06Q 30/02 705/7.42 |
| 8,473,510 B1 | 6/2013 | Tong et al. | |
| 8,533,208 B2 | 9/2013 | Sundaresan et al. | |
| 8,676,730 B2 | 3/2014 | Ghani et al. | |
| 8,818,788 B1 | 8/2014 | Mihalik et al. | |
| 8,856,119 B2 | 10/2014 | Bhagwan et al. | |
| 9,037,464 B1 | 5/2015 | Mikolov et al. | |
| 9,043,197 B1 | 5/2015 | Pasca et al. | |
| 9,727,906 B1 * | 8/2017 | Sarmento | G06F 16/355 |
| 9,990,923 B2 * | 6/2018 | Li | H04M 3/5166 |
| 10,445,745 B1 * | 10/2019 | Chopra | G06F 16/3344 |
| 2005/0105712 A1 * | 5/2005 | Williams | G10L 13/027 379/265.02 |

(Continued)

OTHER PUBLICATIONS

Park et al., "Mining the Minds of Customers from Online Chat Logs" Oct. 2015, ACM (Year: 2015).*

(Continued)

*Primary Examiner* — Irete F Ehichioya
*Assistant Examiner* — Huen Wong
(74) *Attorney, Agent, or Firm* — Proskauer Rose LLP

(57) ABSTRACT

A computerized method is provided for automatically identifying a set of historical issues derived from historical customer interactions with an enterprise. The method includes collecting text-based data corresponding to the historical customer interactions, extracting customer queries from the text-based data, and normalizing and filtering the customer queries to generate the set of historical issues of the customer queries. The method also includes assigning the historical issues to one or more clusters that capture variances among the historical issues. The method further includes generating a legitimacy score for each historical issue and ranking the set of historical issues in accordance with their corresponding legitimacy scores. The method can further include identifying one or more issues in a transcript of unstructured text using the set of historical issues.

16 Claims, 5 Drawing Sheets

(56) References Cited

U.S. PATENT DOCUMENTS

| | | | |
|---|---|---|---|
| 2006/0200342 A1 | 9/2006 | Corston-Oliver et al. | |
| 2007/0294199 A1 | 12/2007 | Nelken et al. | |
| 2008/0091423 A1 | 4/2008 | Roy et al. | |
| 2008/0104054 A1* | 5/2008 | Spangler | G06F 16/355 |
| 2008/0201131 A1* | 8/2008 | Kar | G06F 16/35 |
| | | | 704/9 |
| 2009/0106304 A1* | 4/2009 | Song | G06K 9/6272 |
| 2013/0031063 A1* | 1/2013 | Freris | G06K 9/6223 |
| | | | 707/693 |
| 2014/0192971 A1* | 7/2014 | Sri | G06Q 30/016 |
| | | | 379/265.09 |
| 2014/0297261 A1* | 10/2014 | Sayers | G06F 40/279 |
| | | | 704/9 |
| 2016/0301639 A1* | 10/2016 | Liu | G06Q 50/01 |
| 2016/0330145 A1* | 11/2016 | Patel | H04L 51/04 |
| 2018/0225591 A1* | 8/2018 | Chandramouli | G06F 16/35 |
| 2020/0097797 A1* | 3/2020 | Aragon | G06N 3/08 |

OTHER PUBLICATIONS

Dan Arra, "How to Personalize Customer Journeys With Predictive Analytics", May 22, 2015.*

Harith et al., "Automatic stopword generation using contextual semantics for sentiment analysis of Twitter. In: Proceedings of the ISWC 2014 Posters & Demonstrations Track," 5 pgs, 2014.

Kim et al., "An Unsupervised Approach to Domain-Specific Term Extraction," NICTA, 5 pgs, published prior to Mar. 2017.

Lo et al., "Automatically Building a Stopward List for an Information Retrieval System," University of Glasgow, 8 pgs, published prior to Mar. 2017.

Parisi et al., "Corpus Specific Stop Words to Improve the Textual Analysis in Scientometrics," European Research Council Executive Agency, 7 pgs, published prior to Mar. 2017.

* cited by examiner

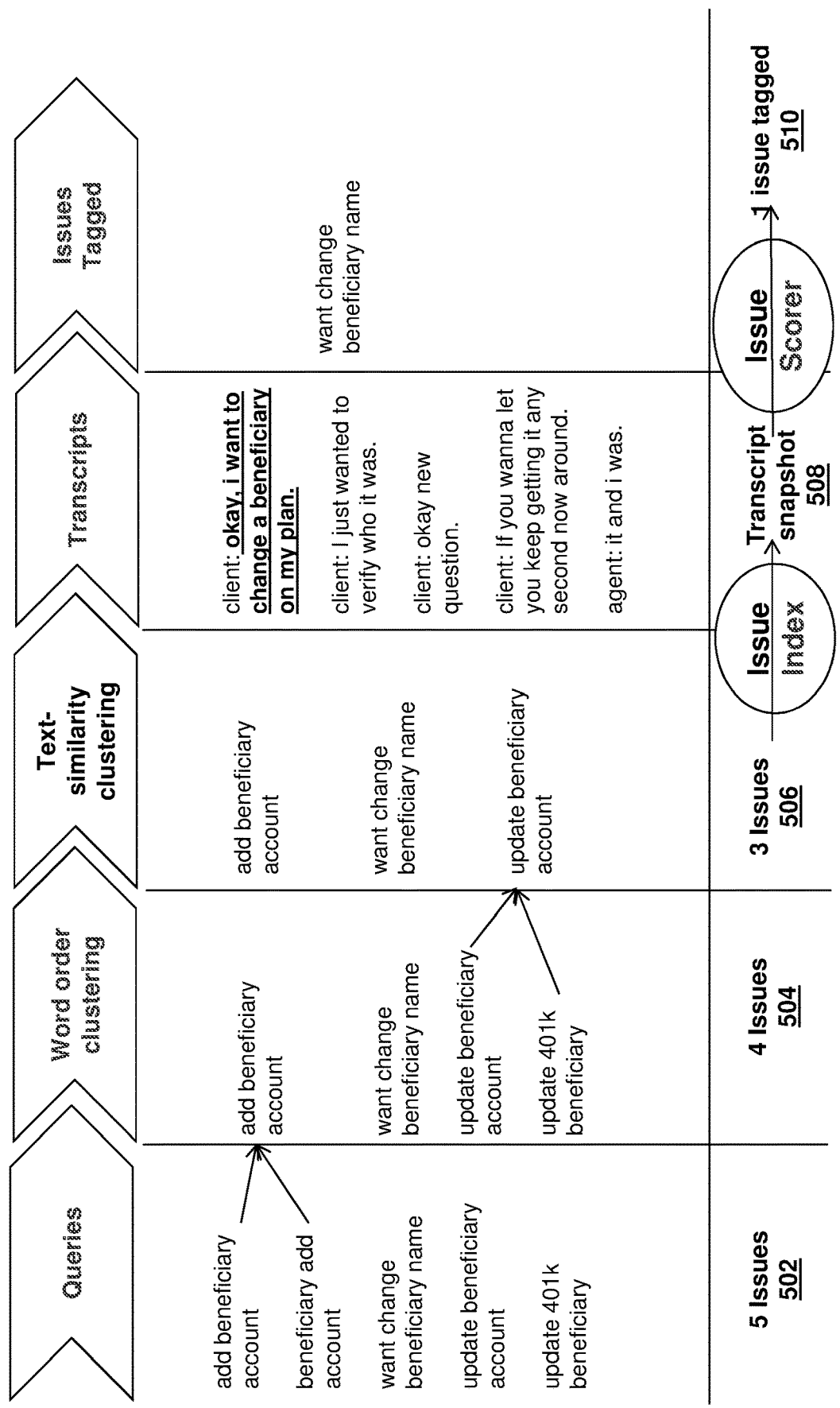

AUTOMATIC IDENTIFICATION OF ISSUES IN TEXT-BASED TRANSCRIPTS

TECHNICAL FIELD

This application relates generally to systems, methods and apparatuses, including computer program products, for automatically identifying one or more issues in text-based transcripts derived from customer interactions with an enterprise.

BACKGROUND

A differentiator for many consumer-oriented industries is the level of customer satisfaction regarding the products/ services offered. Especially in the present time of dynamic technological growth, the rapidly-changing technology landscape drives changes in the way products and services are offered to customers, along with changes in customer-related issues corresponding to these products and services. For example, organizations can sell products and services not only through websites, but also via mobile applications that can give rise to a host of mobile-centric customer issues. In response to these complex and ever-changing issues, almost every consumer-oriented company maintains its own call center, as calls from customers are one of the main sources for understanding customer grievances related to particular products/services. Thus, enabling ease of services through call centers and other forums of interactions can give a company an edge amongst competitors.

However, due to the large volume of calls a company typically receives, it becomes difficult to catalogue and update customer issues manually. In some instances, call center agents maintain a log of customer issues using existing Customer Relationship Management (CRM) tools, but these tools still impose a cumbersome manual process requiring, for example, the agents to manually tag grievances related to customer calls. Specifically, some CRM tools require a call agent to (i) manually characterize issues by determining keywords associated with the issues and (ii) manually search for these keywords across a call transcript to identify pertinent issues associated with the call transcript. However, manual interpretation of call transcripts to glean useful, business-actionable information is generally inefficient and time-consuming. Further, since these customer-related issues tend to change over time, manually maintaining a comprehensive list of the issues is neither possible nor scalable. In some cases, companies maintain a list of possible issues related to products and services by conducting customer surveys, which tend to increase the cost to the company. There is also a large possibility that the resulting list is not comprehensive enough to cover most of the issues customers may encounter, as grievances can be different from one customer demographic to another.

Therefore, systems and methods are needed that can automatically and intelligently identify issues encountered by customers in a business enterprise. This can reduce the overall call volume from customers, which translates to millions of dollars in savings.

SUMMARY

The systems and methods of the present invention can identify issues in customer-agent interactions using digital media, information retrieval and text mining that involve a different, more automated methodology than a conventional manual approach. For example, the systems and methods of the present invention can automatically identify and tag issues in noisy unstructured text representative of an interaction between a customer and a company representative. Exemplary unstructured text can include voice transcripts between customers and call center agents, sales notes, web chat session data, etc. Issues generally refer to one or more reasons for an interaction between a customer and a company representative, the identification of which (especially trending issues) can allow companies to design quick and effective solutions to address them, thereby reducing the overall call volume.

In some embodiments, the systems and methods of the present invention are domain independent so that they can be used on a variety of platforms and across many different types of industries such as banking and financial services, telecom, e-retail, etc. In some embodiments, the systems and methods of the present invention do not use training data for issue identification. Instead, custom text-clustering, information retrieval and data ranking are used that have a higher impact on the overall issue identification accuracy.

In one aspect, a computerized method is provided for automatically identifying a set of historical issues derived from historical customer interactions with an enterprise. The method includes collecting text-based data corresponding to the historical customer interactions, extracting customer queries from the text-based data, and normalizing and filtering the customer queries to generate the set of historical issues of the customer queries. The method also includes assigning the historical issues to one or more clusters that capture variances among the historical issues, and generating a legitimacy score for each historical issue, where each legitimacy score measures an extent of the historical issue being an accurate characterization of at least one of the historical customer interactions. The method further includes ranking the set of historical issues along with their corresponding legitimacy scores.

In some embodiments, the method further includes automatically identifying one or more issues in a transcript of unstructured text using the set of historical issues. The transcript can be generated from a call between a customer and an agent of the enterprise. Automatically identifying one or more issues in the transcript can include dividing the transcript of unstructured text into one or more chunks, iterating through the set of historical issues to determine a relevance score of each historical issue in relation to each of the one or more chunks, selecting one or more of the historical issues with relevance scores greater than a predetermined threshold as the one or more issues associated with the transcript, and ranking the one or more issues for the transcript based on their corresponding relevance scores to determine the relative importance of the issues. In some embodiments, determining a relevance score of each historical issue in relation to each chunk includes extracting at least one n-gram from the each chunk, the n-gram being a contiguous sequence of n items from the chunk, and calculating the relevance score of each historical issue in relation to each chunk based on at least one of (1) matching between the at least one n-gram extracted for the chunk and the historical issue, (2) an extent of the matching, (3) a weight of the chunk based on a position of the chunk in the transcript, or (4) the legitimacy score corresponding to the historical issue.

In some embodiments, the text-based data includes clickstream data generated from customer queries with one or more websites of the enterprise. In some embodiments, extracting customer queries from the text-based data comprises identifying, for each historical customer interaction, at least one substring that includes one or more predefined keywords.

In some embodiments, normalizing the customer queries comprises at least one of (i) collapsing white spaces in each customer query, (ii) removing one or more stop-words in each customer query, or (iii) applying a lemmatization algorithm to each customer query. In some embodiments, filtering the customer queries comprise at least one of (i) removing queries with at least one of customer name or account information or (ii) removing queries with one or more misspelled words.

In some embodiments, assigning the historical issues to one or more clusters comprises assigning historical issues having two or more common words in different or same orders to a common cluster. In some embodiments, assigning the historical issues to one or more clusters comprises clustering the historical issues based on text similarity using an n-gram substring-match algorithm.

In some embodiments, generating a legitimacy score for each historical issue comprises determining at least one of presence of a question in the historical issue, presence of a verb in the historical issue, a number of tokens in the historical issue, or a number of occurrences of the historical issue in the text-based data.

In some embodiments, the method further includes periodically updating the list of historical issues based on additional text-based data related to new customer interactions.

In another aspect, a computerized method is provided for automatically identifying one or more issues in a transcript of unstructured text that captures a transaction between a customer and an enterprise. The method includes generating an indexed list of historical issues derived from historical customer interactions with the enterprise. Generating the indexed list comprises collecting text-based data corresponding to the historical customer interactions, extracting customer queries from the text-based data, and normalizing and filtering the customer queries to identify a set of historical issues of the customer queries. Generating the indexed list also comprises generating a legitimacy score for each of the historical issues, each score measuring an extent of importance of the historical issue in relation to at least one of the historical customer interactions, and indexing the importance scores with their corresponding historical issues to generate the indexed list of historical issues. The method also includes identifying the one or more issues in the transcript based on the indexed list of historical issues, which comprises dividing the transcript into one or more chunks, iterating through the indexed list of historical issues to determine a relevance score of each historical issue in relation to each of the one or more chunks, and selecting one or more of the historical issues with relevance scores greater than a predetermined threshold as the one or more issues associated with the transcript.

In some embodiments, the transcript is generated from a call between a customer and an agent of the enterprise. In some embodiments, identifying the one or more issues in the transcript further comprises ranking the one or more issues based on their corresponding relevance scores.

In some embodiments, generating an indexed list of historical issues further comprises assigning the historical issues to one or more clusters that capture variances among the historical issues.

In yet another aspect, a computerized system is provided for automatically identifying a list of historical issues derived from historical customer interactions with an enterprise. The system includes an extractor configured to receive text-based data corresponding to the historical customer interactions and extract customer queries from the text-based data, a query normalizer, in electrical communication with the extractor, configured to normalize and filter the extracted customer queries to identify a set of historical issues of the customer queries, and a cluster generator, in electrical communication with the query normalizer, configured to assign the historical issues to one or more clusters that capture variances among the historical issues. The system also includes a rank generator, in electrical communication with the cluster generator and the query normalizer, configured to generate a legitimacy score for each historical issue. Each score measures an extent of importance of the corresponding historical issue in relation to at least one of the historical customer interactions.

In some embodiments, the system further comprises an issue identifier configured to automatically identify one or more issues in a transcript of unstructured text using the list of historical issues. The issue identifier can be configured to divide the transcript of unstructured text into one or more chunks, iterate through the list of historical issues to determine a relevance score of each historical issue in relation to each of the one or more chunks, and select one or more of the historical issues with relevance scores greater than a predetermined threshold as the one or more issues associated with the transcript.

In some embodiments, the text-based data includes clickstream data generated from customer queries with one or more websites of the enterprise.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 5 is an illustrative example of at least a portion of the process of FIG. 2 and the process of FIG. 3 for determining one or more issues of a transcript of unstructured text.

DETAILED DESCRIPTION

In one aspect, the present invention features a two-stage approach for automatically identifying issues in unstructured text representative of an interaction between a customer and a company representative (e.g., a call center agent). The first stage of the approach involves generating and indexing a list of issues of historical customer behavior from a search log, where the historical issues can represent the universe of issues known and present in a business enterprise. The second stage involves using the historical issues as a knowledge base from which issues pertaining to a particular interaction are identified. During the first stage, a query list can be first generated from the search log, which captures historical customer interaction with a company and can be obtained from various sources within the company (e.g., clickstream data of the company web site). The query list can be pruned and used to identify the list of issues representative of historical customer behavior. During the second stage, a scoring algorithm (e.g., a fuzzy matching technique) can be applied to the historical issues generated from the first stage to identify issues related to certain unstructured text corresponding to a particular customer-representative interaction, e.g., chat data from a web session, a call transcript, representative notes, etc.

Figure 1:
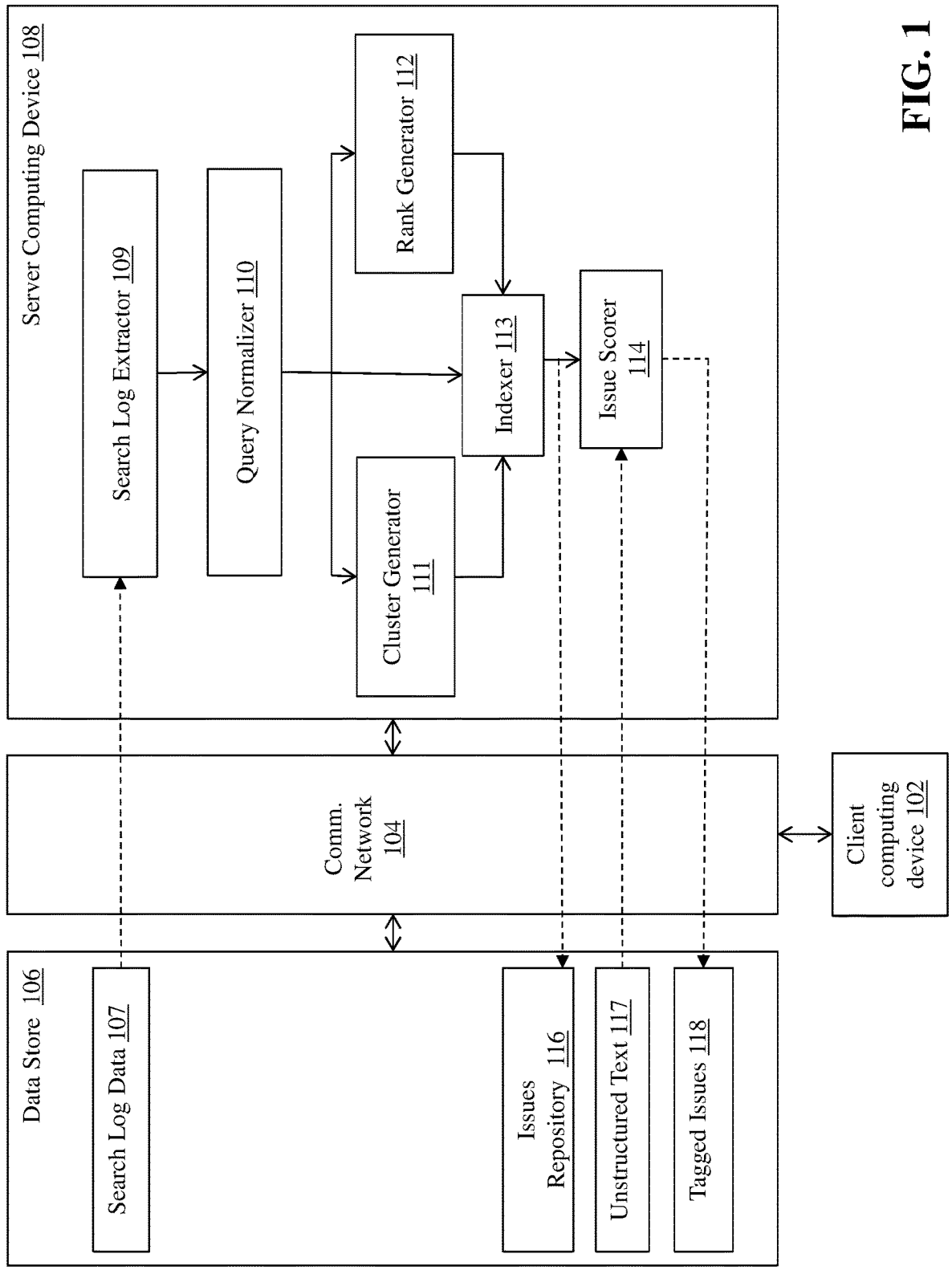
FIG. 1 is a block diagram of a system used in a computing environment in which unstructured text is analyzed for identification of issues.

FIG. 1 is a block diagram of a system 100 used in a computing environment in which unstructured text is analyzed for identification of issues representative of issues in an interaction between a customer and a company representative. An issue in the context of the present invention is not limited to customer complaints, but can be any reason behind a customer-representative interaction. As shown, the system 100 includes a client computing device 102, a communications network 104, a data store 106, and a server computing device 108.

The client computing device 102 connects to the communications network 104 to communicate with the server computing device 106 and/or the data store 106 to provide input and receive output relating to the process of analyzing unstructured computer text for identification of customer issues as described herein. For example, the client computing device 102 can provide a detailed graphical user interface (GUI) that presents output resulting from the analysis methods and systems described herein, where the GUI can be utilized by an operator to review and/or modify a set of issues as generated and evaluated by the system 100.

Exemplary client devices 102 include but are not limited to desktop computers, laptop computers, tablets, mobile devices, smartphones, and internet appliances. It should be appreciated that other types of computing devices that are capable of connecting to the components of the system 100 can be used without departing from the scope of invention. Although FIG. 1 depicts a single client device 102, it should be appreciated that the system 100 can include any number of client devices. And as mentioned above, in some embodiments the client device 102 also includes a display for receiving data from the server computing device 108 and/or the data store 106 and displaying the data to a user of the client device 102.

The communication network 104 enables the other components of the system 100 to communicate with each other in order to perform the process of analyzing unstructured text for identification of customer issues as described herein. The network 104 may be a local network, such as a LAN, or a wide area network, such as the Internet and/or a cellular network. In some embodiments, the network 104 is comprised of several discrete networks and/or sub-networks (e.g., cellular to Internet) that enable the components of the system 100 to communicate with each other.

The server computing device 108 is a combination of hardware, including one or more processors and one or more physical memory modules and specialized software engines that execute on the processor of the server computing device 108, to receive data from other components of the system 100, transmit data to other components of the system 100, and perform functions for analyzing unstructured text for identification customer issues as described herein. As shown, the processor of the server computing device 106 executes a search log extractor module 109, a query normalizer module 110, a cluster generator module 111, a rank generator module 112, an indexer module 113, and an issuer scorer module 114. In some embodiments, the modules 109-114 are specialized sets of computer software instructions programmed onto a dedicated processor in the server computing device 108 and can include specifically-designated memory locations and/or registers for executing the specialized computer software instructions. Further explanation of the specific processing performed by the modules 109-114 will be provided below.

The data store 106 is a computing device (or in some embodiments, a set of computing devices) that is coupled to the server computing device 108 and is configured to generate, provide, receive and store specific segments of data relating to the process of analyzing unstructured computer text for identification of issues as described herein. In some embodiments, all or a portion of the data store 106 can be integrated with the server computing device 108 or located on a separate computing device or devices. For example, the data store 106 can comprise one or more databases, such as MySQL™ available from Oracle Corp. of Redwood City, Calif. As shown, the data store 106 includes search log data 107, an issues repository 116, unstructured text 117, and a repository for storing tagged issues 118.

The search log data 107 captures historical interactions between customers and a business enterprise and is thus a rich source for collecting information related to customer behavior and interactions with the business enterprise. In some embodiments, the search log data 107 includes text-based clickstream data, which may include past customer queries with one or more websites of the business enterprise to obtain information related to certain problems with products and/or services provided by the enterprise. The search log data 107 can also include search log data from public search engines related to the business enterprise. The search log data 107 can further include a category seed list describing a list of transactions to which the clickstream data of past customer queries correlates. The search log data 107 can be supplied to the server computing device 108 for extracting issues of historical customer behavior that forms an issue knowledge base, i.e., a pool of issues known and present in the company. The server computing device 108 can store these issues in the issues repository 116 of the data store 106. Specifically, the issues in the issues repository 116 is generated via processing by the engines 109-113 using the search log data 107 as an input, as will be described in greater detail below.

The transcript of unstructured text 117 is a text-based representation of an interaction between a customer and company representative. The unstructured computer text can comprise data derived from a variety of sources, including but not limited to voice-to-text transcripts (e.g., of customer service calls), customer service representative notes (e.g., entered by the representative into a terminal during a customer interaction), verbatim survey responses or other similar types of feedback, chat transcripts from online interactions, and so forth. The unstructured text 117 can be supplied to the server computing device 108 for determination of one or more customer-related issues in the text using the issues of historical customer behavior stored in the issues repository 116. Specifically, the customer-related issues in the unstructured text 117 is generated via processing by the engine 114 using the issues of historical customer interactions in the issues repository 116, as will be described in greater detail below. The customer-related issues identified and tagged for a given unstructured text 117 can be stored in the tagged-issues repository 118 of the data store 106.

The search log data 107 and/or the unstructured text 117 can be received and stored by the data store 106 via input from a web site/web page, or the data can be received and stored directly into the data store 106 by utilizing computer files (e.g., XML, CSV, TXT). For example, a user at client computing device 102 can utilize a GUI provided by the client computing device 102 to select and/or input the search log data 107 or the unstructured computer text 117 (e.g. directly and/or as a computer file) and transmit the text to the data store 106. In another example, the data store 106 can retrieve the search log data 107 and/or the unstructured text 117 from one or more repositories and/or computing systems (e.g., as a data feed and/or a file), such as customer relationship management systems, customer/employee feedback or survey systems, social media systems, human resources systems, and so forth.

Figure 2:
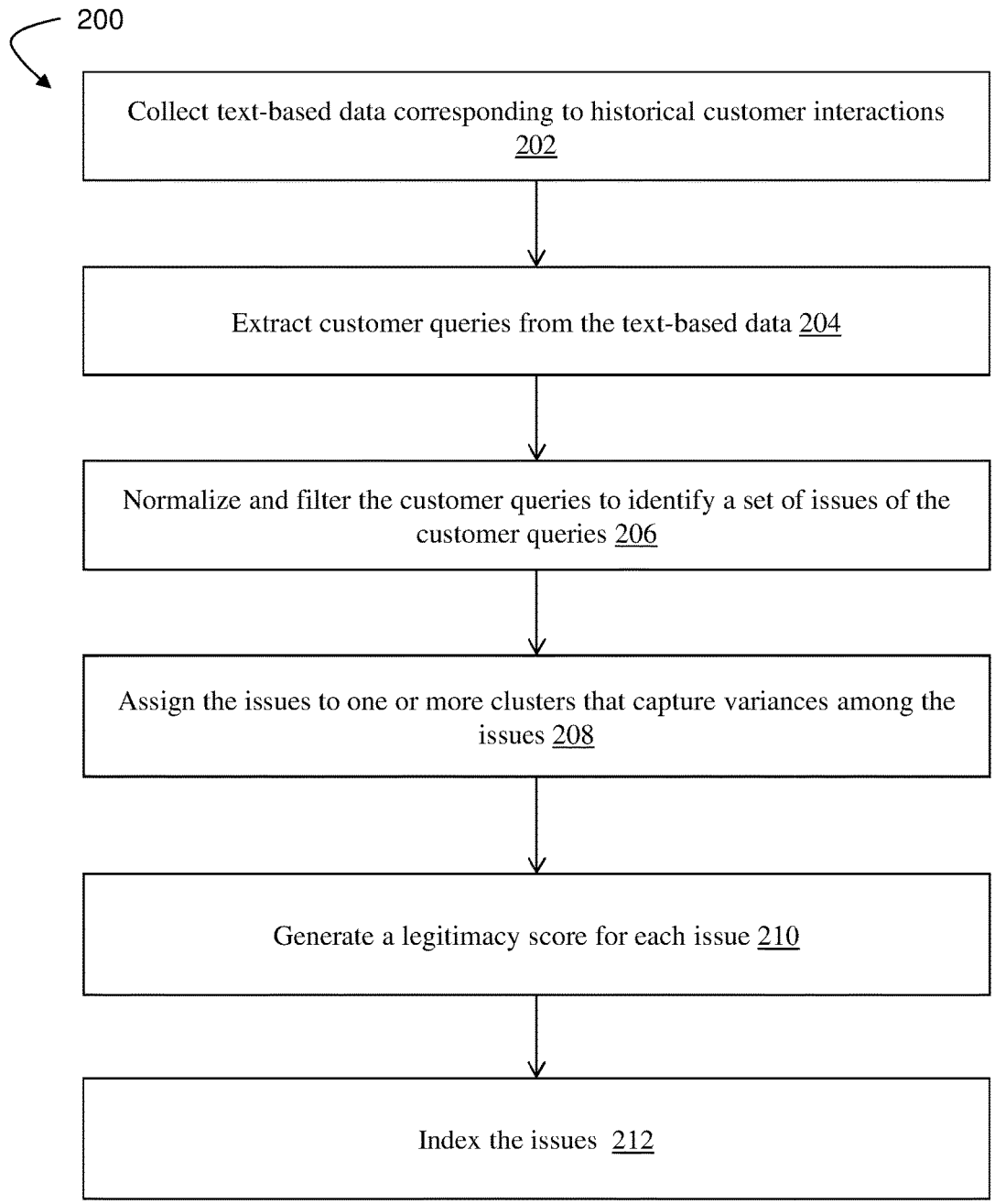
FIG. 2 is a flow diagram of a process in which issues of historical customer interactions are determined using at least a portion of the system of FIG. 1.

FIG. 2 is a flow diagram of a process 200, in which issues of historical customer interactions are determined using at least a portion of the system 100 of FIG. 1. These issues capture known customer-related issues and represent the universe of issues associated with a business enterprise. The process 200 of FIG. 2 can be a first stage (i.e., an indexing phase) of a two-stage process for identifying one or more issues in a particular unstructured text or a stand-alone process.

First, the search log data 107 in the data store 106 is collected and supplied to the search log extractor module 109 (step 202). As described above, the search log data 107 can include text-based data (e.g., clickstream data) related to historical customer queries made with a business enterprise (e.g., via a website of the business enterprise) in relation to one or more historical transactions. The search log extractor module 109 is configured to extract from the search log data 107 a list of relevant customer queries of interest (step 204). The search log extractor module 109 can use a list of predefined keywords or key-phrases for each type of transaction to search the search log data 107 for obtaining the desired customer queries. These predefined keywords/phrases may have high recall and low precision in identifying issues. For example, if a keyword appears as a part (e.g., a substring) of a particular customer query, then the customer query can be selected by the search log extractor module 109 for further processing. As an example, a transaction related to pin-password maintenance can be associated with the keywords/phrases "password" and "password blocked," where these keywords/phrases can have high recall and low precision in identifying issues including (i) change password, forgot password, reset password, (ii) why was my password blocked, (iii) how to update a password when blocked, and/or (iv) need to fix password blocked. The search log extractor module 109 can thus select the customer queries in the search log data 107 that contain these predefined keywords/phrases as queries of interest for further processing.

However, the customer queries selected by the search log extractor module 109 can be error prone, as they are directly obtained from customers of various demographics, which can give rise to syntactic variants. Hence, the selected customer queries from the search log extractor module 109 are cleaned (e.g., normalized and filtered) by the query normalizer module 110 to generate a set of standardized issues (step 206).

The query normalizer module 110 can apply one or more normalization techniques to a query of interest, including collapsing multiple consecutive white spaces into one white space or collapsing entity-specific references (e.g., "you," "me," or "us") into one entity. The query normalizer module 110 can also normalize the queries by removing one or more stop words from the queries, which are generally common and/or context-specific words in a given language. These stop words are considered noise, add little value to analytics, and are removed to improve the quality of the text from the perspective of understanding critical aspects of the text content—such as sentiment, intent, and the like—in downstream applications. Examples of stop words identified by the system 100 are first names (e.g., "Barbara," "David," "Alison"), entity-specific acronyms or strings (e.g., ID numbers), or generic, frequently-used words, such as 'the,' 'and,' 'a' and the like. The query normalizer module 110 can also apply a lemmatization algorithm to normalize the customer queries by collapsing inflectional forms and derivationally-related forms of a word in a query to a common base form. For example, the word "walking" or "walks" in a query can be reduced to their base form "walk." Further, the query normalizer module 110 can normalize the queries by combining multiple words into one word if the multiple words commonly appear in either the separated or combined form. For example, the words "set up" can be combined to form "setup" and the words "log in" can be combined to form "login." In some embodiments, a dictionary can be maintained to catalog these common combinations.

The query normalizer module 110 can also apply one or more filtering techniques to the customer queries of interest to eliminate queries of less importance, such as removing unigram queries (i.e., queries with a single word), queries with names and/or account numbers, queries with misspelled word(s), and/or queries with atypical words (e.g., words that are not in a dictionary and not defined by the business enterprise).

The resulting normalized and filtered customer queries from the query normalizer module 110, which are hereinafter referred to as issues, can be provided to the optional cluster generator module 111 that is configured to assign the issues to one or more clusters to capture and reduce variances among the issues (step 208). These variances can be caused by, for example, variances in the demographics of the customers from whom the original search log data 107 are collected. The variances can also be caused by variances in the orders of words used in the issues. For example, some issues have the same words but different word orders (e.g. "add spouse as beneficiary," "add beneficiary spouse" and "spouse beneficiary add"). Further, these variances can be caused by variant vocabulary usage, where customers can use different, but similar words to express the same concern, depending on the differences in frequently-used vocabulary. For example, the terms "add spouse as beneficiary," "designate spouse as beneficiary," and "name spouse as beneficiary" are just some of the different ways to express the same meaning. Generally, issues with variant semantic or syntactic forms cannot be completely eliminated as they may contain important issues. However, it is not effective to maintain them in independent forms as they give rise to duplications and inefficiency.

The cluster generator module 111 is configured to cluster issues of similar syntactic and semantics to reduce and/or eliminate these variances. In some embodiments, the cluster generator module 111 reduces and/or eliminates variances in word orders associated with the issues by (i) sorting the words in each issue in an alphabetical order, and (ii) assigning issues that have the exact word match (in the alphabetical order) to the same cluster. Hence, the cluster generator module 111 can assign issues having two or more words in different or same orders to a common cluster.

In some embodiments, the cluster generator module 111 reduces and/or eliminates variances in the issues by grouping issues having synonymous words into a common cluster using a synonym-based matching algorithm. A web-based thesaurus can be used to identify synonyms in the issues. For example, the words "add" and "designate" can be treated as synonyms of each other. Thus, issues like "add beneficiary" and "designate beneficiary" can belong to the same cluster.

In some embodiments, the cluster generator module 111 reduces and/or eliminates variances in vocabulary usage associated with the issues by clustering issues based on text similarity using a substring-match algorithm. In one exemplary implementation, an n-gram is first initialized to define a contiguous sequence of n words (e.g., n=3). Then a cluster-center issue string is initialized, where the cluster-center issue string uses n-grams (e.g., 3 words if n=3) to define a customer issue based on which a cluster can be formed. Specifically, issues containing n-grams that are similar to the issue string can be grouped into one cluster. The cluster-center issue string can be automatically generated. For example, issues that include one or more question words (e.g., "what," "where," and/or "when") can be automatically chosen by the cluster generator module 111 as the cluster-center issue strings.

In some embodiments, a sub-string match score is calculated for each of the issues from the query normalizer module 110 against the cluster-center issue string to determine a text-similarity match between the issue and the issue string, such that the issues with scores greater than a threshold are grouped in the same cluster represented by the issue string. Hence, all the issues in a single cluster are represented by the same cluster-center issue string and contain a tolerable degree of variances from the issue string. In some embodiments, the sub-string match score is calculated using equation 1 below:

$$Score = \frac{\sum_{n=1}^{3} \text{Weight}(n\text{-gram}) * \text{Count}(n\text{-gram-matched})}{\sum_{n=1}^{3} \text{Weight}(n\text{-gram}) * \text{Count}(n\text{-gram in cluster center})},$$

Equation 1

In equation 1, the weight (n-gram) is a configurable parameter that represents the importance assigned to an n-gram match. For example, this parameter can be [1, 10, 100] for unigram, bigram and trigram, respectively. The count (n-gram-matched) represents the count of n-grams matched between the cluster-center issue string and the candidate n-gram issue string in a given issue. The count (n-gram in cluster center) element represents the total n-grams in the cluster-center issue string. The cluster generator module 111 can formulate a cluster based on each cluster-center issue string such that issues with a sufficiently high sub-string match score (e.g., higher than a predefined threshold) with respect to a cluster-center issue string is assigned to the corresponding cluster for that string. For example, (i) the issues "change password," "change log on password," and "request for change password" can be grouped into one cluster, (ii) the issues "automatic investment," "automatic stock investment," and "automatic share investment" can be grouped into one cluster, and (iii) the issues "change beneficiary," "where to change beneficiary," and "change beneficiary on pension" can be grouped into one cluster.

In some embodiments, the cluster generator module 111 chooses one representative issue from each cluster of one or more issues for further processing. This can reduce redundancy and increase efficiency of the overall indexing process 200. For example, the subsequent ranking performed by the rank generator module 112 and indexing performed by the indexer module 113 can be based on the representative issues produced by the cluster generator module 111.

The rank generator module 112 can further rank the representative issues from the cluster generator module 111. Alternatively, the rank generator module 112 can rank the issues from the query normalizer module 110, if clustering by the cluster generator module 111 is not chosen. Because the issues are identified based on historical customer queries regarding specific transactions, the rank generator module 112 can rank the issues based on their relative importance to the respective transactions. In some embodiments, the rank generator module 112 assigns a legitimacy score to each of the issues, where the legitimacy score measures the extent of the issue's legitimacy/importance in relation to their corresponding transactions (step 210). Each legitimacy score can be computed based a linear combination (e.g., a weighted sum) of several elements including (i) the presence of a question word in the issue, (ii) the presence of a verb in the issue, (iii) the number of tokens (i.e., words) in the issue, (iv) the number of times the issue appeared in the search log data 107, and/or (v) the result of a subset matching technique. The number of times the issue appeared in the search log data 107 indicates the importance of the issue to the customers. The subset matching technique takes an issue that is in the form of a question (e.g., "Where can I add beneficiary", "How should I add beneficiary", "How can I add beneficiary online") and determines a substring that is also an issue of its own (e.g., "add beneficiary" for all three issues). Because the extracted substring issue is present in one or more questions, the rank generator module 112 can assign the substring issue a higher legitimacy score than an issue that is not a part of a question. The rank generator module 112 can generate the legitimacy score for each issue by normalizing the scores for the individual elements described above using a min-max normalization algorithm and then linearly combine them to obtain the final legitimacy score.

In some embodiments, the rank generator module 112 ranks the issues in a particular transactional category in an order based on their corresponding legitimacy scores. As an example, with respect to transactions related to beneficiaries, the following issues are ranked and ordered based on their relative importance (e.g., from the most to the least important): (i) How to add beneficiary, (ii) how to view beneficiary, and (iii) find beneficiary information. As another example, with respect to transactions related to password, the following issues are ranked and ordered based on their relative importance (e.g., from the most to the least important): (i) where to reset password, (ii) how often change password, and (iii) password reset not working. As yet another example, with respect to transactions related to investments, the following issues are ranked and ordered based on their relative importance (e.g., from the most to the least important): (i) how to change automatic investment, (ii) how to skip an automatic investment, and (iii) change my annuity investment date. The legitimacy scores are particularly useful when identifying issues for a given transcript of unstructured text using the issues of historical customer interactions generated by the process 200. If two or more issues identified for the transcript are similar, the ranking (i.e., legitimacy scores) of the identified issues can be used as a tie-breaker for selecting the issue that is most relevant to the transcript.

At least one of (i) the issues from the query normalizer module 110, (ii) the representative issues of various clusters from the cluster generator module 111, or (iii) the ranked issues from the rank generator module 112 can be provided to the indexer module 113. The indexer module 113 can be configured to index certain data for the issues (step 212). In view of the ever-expanding pool of issues, which represent the universe of known customer issues, the indexer module 113 can store data for the issues in a way that facilitates fast retrieval when required (step 212). Specifically, the indexer module 113 can index an importance score for each of the issues, where each importance score measures the importance of one or more n-grams present in the corresponding issue.

For a given issue, not all words in the issue are equally important. To incorporate and quantify such variability of importance of words in an issue text string, the indexer module 113 calculates an average of weights of unigrams (i.e., individual words) that appear in an n-gram of the issue text string. Each unigram weight can be calculated using a "tf-idf" approach to quantify the relative importance of the corresponding unigram/word across the issues for a particular transaction. In some embodiments, the indexer module 113 can normalize the unigram weights such that the sum of the weights of the unigrams in an issue text string is 1. Thus, the average weight of the constituting unigrams in an n-gram of an issue is an importance score that indicates the importance of that issue on a scale from 0 to 1. The indexer module 113 can index/store the importance stores with their respective issues.

As an example, given the issues "'add beneficiary" and "add beneficiary 403b," the weights of the unigrams in "'add beneficiary" are: add=0.679, beneficiary=0.321, and the weights of the unigrams in "add beneficiary 403b" are: add=0.369, beneficiary=0.174, 403b=0.457. These unigram weights allow fast identification of issues for a particular transcript of unstructured text using the pool of historical issues generated from the process 200. For example, if the phrase "add beneficiary" is present in a transcript, it would be preferred that the issue "add beneficiary" is selected to characterize the transcript than "add beneficiary 403b." This is made possible by having "add" and "beneficiary" having higher weights in "add beneficiary" when compared to "add beneficiary 403b."

In some embodiments, the indexer module 113 can provide the ranked and indexed list of issues to the data store 106 for storage in the issues repository 116 of the data store 106. The ranked and indexed list can be created by the rank generator module 112 and the indexer module 113 based on the issues from the query normalizer module 110 or the representative issues of various clusters from the cluster generator module 111. Specifically, the issues repository 116 can store the issues in an order indicated by their legitimacy scores and can index identifiers and importance scores with the ranked issues.

In some embodiments, the process 200 described in FIG. 2 can be updated on a periodic basis to edit and/or expand the indexed list of issues related to historical customer interactions, which serves as a knowledge base from which issues of a particular transcript of unstructured text can be identified. For example, the search log data 107 can be updated to capture more recent customer interactions with a business enterprise. The updated search log data 107 can drive the automatic generation of new and/or different historical issues by the modules 109-113 using the process 200 described above.

Figure 3:
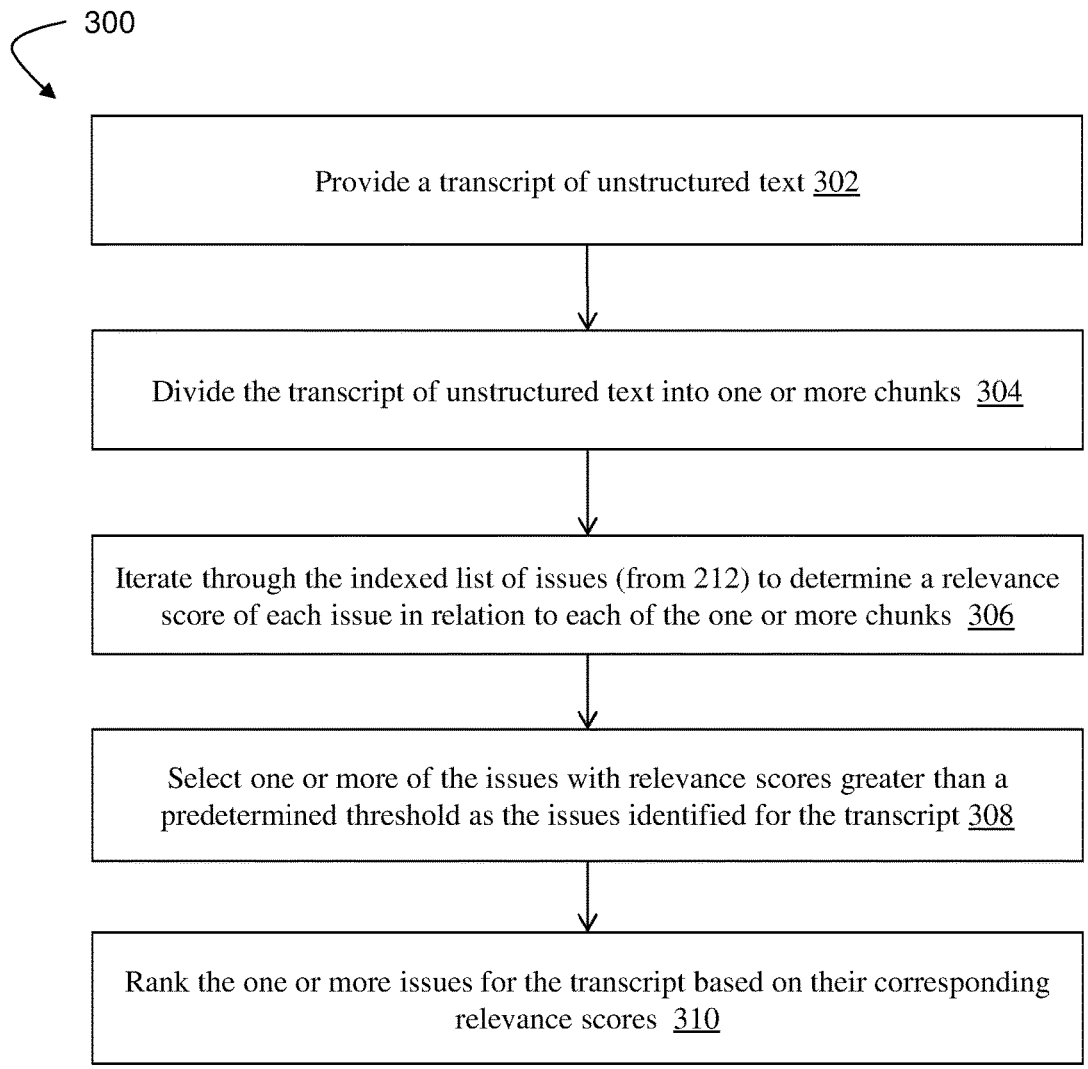
FIG. 3 is a flow diagram of a process in which issues of a transcript of unstructured text are automatically determined using the issues of historical customer behavior generated by the process of FIG. 2.

FIG. 3 is a flow diagram of a process 300 in which issues of a transcript of unstructured text are automatically determined using the issues of historical customer interactions generated by the process 200 of FIG. 2. FIG. 3 can thus constitute a second stage (i.e., a scoring phase) of a two-stage process, where the first stage (i.e., the indexing phase) is described above in relation to the process 200 of FIG. 2. In alternative embodiments, the processes of FIGS. 2 and 3 are executed at different times and/or independently from each other.

The transcript of unstructured text 117 in the data store 106 can be provided to the issuer scorer module 114 (step 302). Each transcript serves as a query used by the issue scorer module 114 to search the ranked and indexed issues of historical customer behavior in the issues repository 116, from which pertinent issues of the transcript are automatically determined. The issuer scorer module 114 accomplishes by first chunking the unstructured text (step 304) to divide it into multiple parts/chunks. The unstructured text can be chunked based on the number of sentences in the texts, or other chunking parameters (e.g., the presence of commas or periods).

In some embodiments, one or more n-grams are created from each chunk, where each n-gram can be used to search against the indexed list of issues of historical customer behavior as a part of a relevance determination methodology described in detail below. In some embodiments, due to the noise in the transcript of unstructured text 117, the matching of exact n-grams, especially for a high n, against the issues of historical customer interactions can be difficult. Therefore, "k-skip n-grams" (generally referred to as skip grams) are created from each chunk, and the issuer scorer module 114 can match the issues of historical customer interactions using the skip grams. Specifically, skip grams are grams in which the words need not be consecutive in the text under consideration, but may leave gaps of k words that are skipped over. This allows the issuer scorer module 114 to obtain more of a context in the matching process and also error proof the process in cases where consecutive words in the unstructured text are wrongly transcribed. In some embodiments, the issue scorer module 114 extracts 2-skip-3-grams from the text chunks, where each gram comprises 3 words from the original text chunk that can maintain at most 2 words skipped over. For example, in the text chunk "I need to reset my log-in password," the skip grams can give rise to trigrams such as "need reset log-in" and "need reset password."

Each of the chunks of a given transcript are iteratively compared against the ranked and indexed list of issues of historical customer behavior, such that a relevance score is determined between a text chunk and an issue, where the relevance score measures the relevance of the issue to the chunk (step 306). In some embodiments, for each text chunk of a transcript, the relevance of an issue to the text chunk, as represented by a relevance score, can be measured based on one or more of the following four factors: (i) n-gram match, (2) extend of the match, (3) chunk weight, and (4) rank of the issue. A relevance score that is a linear combination of one or more of these four factors can be used to measure the extent of match between the chunk and an issue.

For the n-gram match factor, each of the n-grams (or skip grams) of a chunk of the transcript from step 304 is compared to an issue in the ranked and indexed list of issues of historical customer behavior. A match score can be calculated that measures the extent of match between the n-gram and the issue. For example, a match score can be computed using equation 2 below:

$$\text{Match score} = \Sum_{n=1}^{3} \text{weight}(n\text{-gram}) * \text{Importance}(n\text{-gram}) \quad \text{Equation 2}$$

In Equation 2, the weight can be [1, 10, 100] for a trigram. The importance element represents the importance score of the historical issue that is computed by the indexer module 113 as described above with reference to FIG. 2. Each importance score can be retrieved by the issue scorer module 114 from the issues repository 116.

The extent of match factor is determined as the fraction of the tokens (i.e., words) matched between a chunk and an issue. For example, if an issue is "want to change login password," but in the chunk is only "want to change password," the extent of match for the chunk is 0.75, i.e. 3 out of 4 tokens matched.

The rank of issue factor represents the legitimacy score of the issue being measured against, which is determined by the rank generator 112 as described above with respect to FIG. 2. Each legitimacy score can be retrieved from the issues repository 116. The legitimacy score is useful in situations where two or more issues identified for the transcript are similar, and the legitimacy scores of the identified issues can be used as a tie-breaker for selecting the issue that is most relevant to the transcript.

The chunk weight factor comprises the weight of the chunk based on the position of the chunk in the transcript. For example, if it is observed that most of the transcripts have the core issues or issues in the first half of the transcript, then the chunks that appear in the first half of a transcript is assigned a higher weight than those that appear in the second half. The chunk weight factor can be computed using Equation 3 below:

$$\text{chunk weight} = \frac{\max(\text{chunk position desired} - \text{chunk position})}{\max(\text{chunk position desired}) - \min(\text{chunk position desired})} \quad \text{Equation 3}$$

In Equation 3, chunk position desired indicates the chunk position within a transcript that yields most issues, and chunk position indicates the position of the current chunk within the transcript.

In some embodiments, the values representative of the fours factors are normalized using a min-max normalization scheme. In some embodiments, the values representative of the four factors are linearly combined to generate a relevance score, where each value can be assigned a different weight. For example, the weights can be assigned in the following descending order from most relevant to least relevant: n-gram match score, extent of the issue matched, rank of the issue and chunk weight.

The issue scorer module 114 can select the issues of historical customer interactions with relevance scores greater than a predetermined threshold as the issues that are most relevant to the transcript of unstructured text (step 308). As described above, each relevance score represents the relevance of the corresponding issue to at least one chunk of the transcript. Thus, the selected issues can represent the most relevant issues that are present in the transcript of unstructured text. In some embodiments, the issue scorer module 114 can rank these selected issues according to their relevance scores (step 310), which are used to indicate the relative importance of the selected issues in relation to the transcript. In some embodiments, the issue scorer module 114 stores the issues that are identified/tagged as most relevant to a transcript of unstructured text in the tagged-issues repository 118 of the data store 106. These relevant issues can be ranked based on their corresponding relevance scores in the repository 118.

Figure 4:
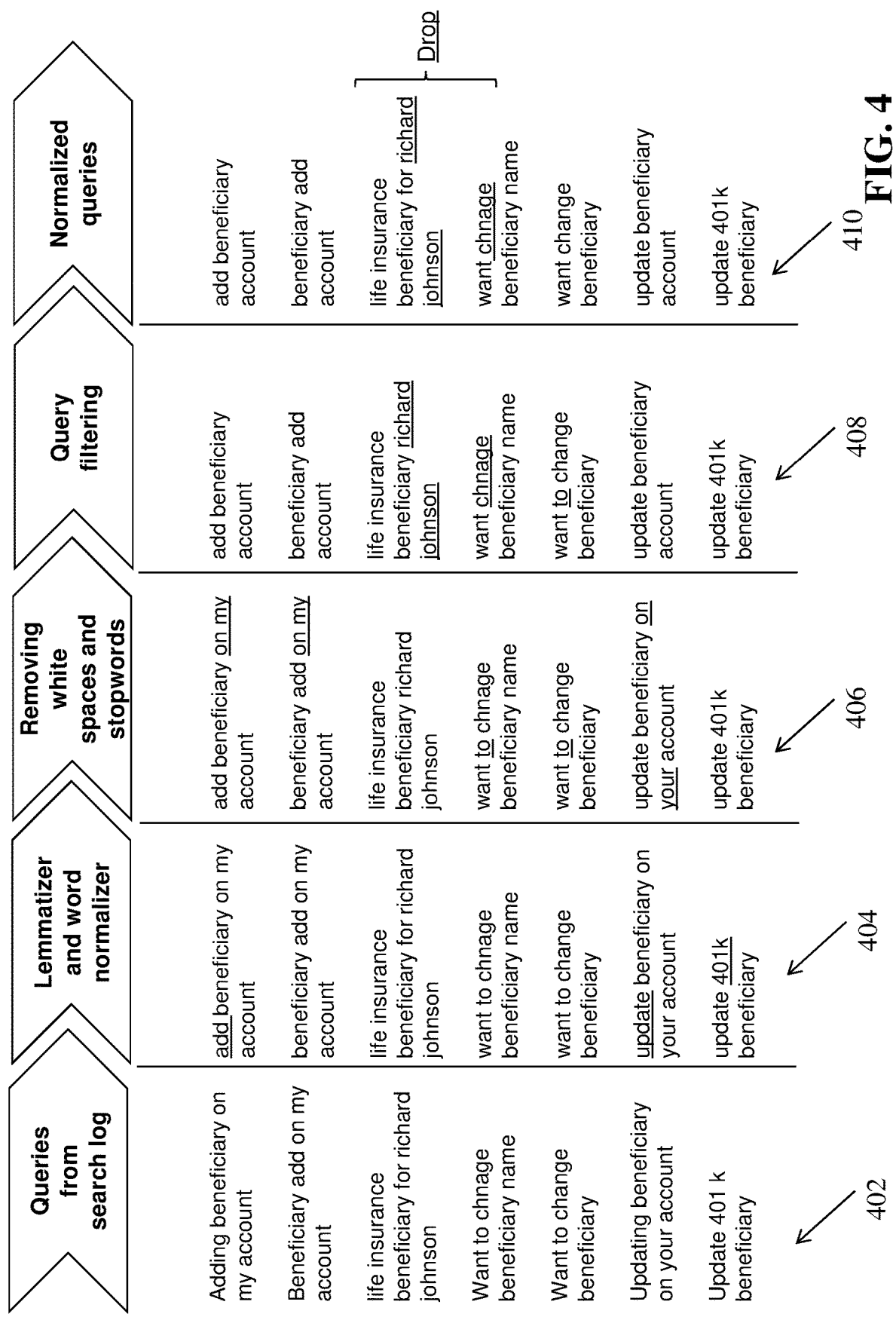
FIG. 4 is an illustrative example of at least a portion of the process of FIG. 2 for indexing a list of issues related to historical customer interactions.

FIG. 4 is an illustrative example of at least a portion of the process 200 of FIG. 2 for indexing a list of issues related to historical customer interactions. Column 402 shows exemplary queries extracted by the search log extractor module 109 from the search log data 107 during step 204 of the process 200. Columns 404, 406 and 408 show the same queries after each stage of processing by the query normalizer module 110 during step 206 of the process 200. For example, the query normalizer module 110 can convert all uppercase letters in the queries to lowercases to generate the queries shown in column 404. A lemmatization algorithm can be applied by the query normalizer module 110 to the queries to generate the lemmatized queries shown in column 406. The query normalizer module 110 can remove white spaces and stop words from the queries to generate the processed queries shown in column 408. The query normalizer module 110 can further filter the queries to eliminate queries of less importance, such as removing unigram queries (i.e., queries with a single word), queries with names and/or account numbers, or queries with misspelled word(s). For example, as shown in column 410 of the resulting normalized and filtered issues, the queries with customer name ("richard johnson") and a misspelled word ("change") are removed.

FIG. 5 is an illustrative example of at least a portion of the process 200 of FIG. 2 and the process 300 of FIG. 3 for determining one or more issues of a transcript of unstructured text. Column 502 shows a list of 5 exemplary issues of historical customer interactions generated by the query normalizer module 110 after step 206 of the process 206. The cluster generator module 111 can assign the issues to one or more clusters to capture variances among the issues at step 208 of the process 200. As shown in column 504, the cluster generator module 111 can group the issues "add beneficiary account" and "beneficiary add account" into one cluster under "add beneficiary account" because they contain the same words in different orders. Hence, only 4 representative issues remain after clustering based on word order. As shown in column 506, the cluster generator module 111 can also group the issues "update beneficiary account" and "update 401k beneficiary" into one cluster under "update beneficiary account" after applying the text similarity algorithm described above in relation to Equation 1. Hence, only 3 representative issues remain after clustering based on word similarity.

For this illustrative example, these 3 issues can represent the universe of known issues that are used to identify particular issues in a transcript of unstructured text. In some embodiments, these issues are ranked by the rank generator module 112 and/or indexed by the indexer module 113 as described above in steps 210 and 212 of the process 200, respectively. For example, given a transcript shown in column 508, the issue scorer module 114 can identify and select one issue (shown in column 510) from the list of 3 historical issues (shown in column 506) that is most pertinent to the transcript 508. The issue scorer module 114 can perform this identification using the process 300 described above with respect to FIG. 3.

The above-described techniques can be implemented in digital and/or analog electronic circuitry, or in computer hardware, firmware, software, or in combinations of them.

The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile computing device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computerized method for automatically identifying a set of historical issues derived from historical customer interactions with an enterprise, the method comprising:
    collecting text-based data corresponding to the historical customer interactions;
    extracting customer queries from the text-based data;
    normalizing and filtering the customer queries to identify the set of historical issues of the customer queries, wherein each historical issue comprises a set of one or more unigrams;
    assigning the historical issues to one or more clusters that capture and reduce variances among the historical issues, wherein each cluster of historical issues is associated with a representative historical issue, and the historical issues in the corresponding cluster have tolerable degrees of variance from the representative historical issue;
    generating a legitimacy score for each of the representative historical issues, each legitimacy score configured to evaluate at least one of presence of a question in the representative historical issue, presence of a verb in the representative historical issue, a number of tokens in the representative historical issue, or a number of occurrences of the representative historical issue in the text-based data;
    ranking the set of representative historical issues in accordance with their corresponding legitimacy scores; and
    indexing the representative historical issues based on an importance score for each representative historical issue, wherein each importance score is an average of weights of the constituting unigrams in the corresponding representative historical issue, each importance score quantifying an importance of the corresponding historical issue based on the weights of the constituting unigrams,
    wherein the importance scores are used to match a new incoming transcript with one or more of the historical issues, and the legitimacy scores are used as a tie-breaker for selecting a historical issue from a plurality of matched historical issues that are most relevant to the new incoming transcript determined by iterating through the plurality of historical issues.

2. The computerized method of claim 1, further comprising automatically identifying one or more issues in an incoming transcript of unstructured text using the set of historical issues derived from historical customer interactions.

3. The computerized method of claim 2, wherein automatically identifying one or more issues in an incoming transcript comprises:
    dividing the incoming transcript of unstructured text into one or more chunks;
    iterating through the set of historical issues to determine a relevance score of each historical issue in relation to each of the one or more chunks;
    selecting one or more of the historical issues with relevance scores greater than a predetermined threshold as the one or more issues associated with the incoming transcript; and
    ranking the one or more issues for the incoming transcript based on their corresponding relevance scores to determine the relative importance of the issues with respect to the incoming transcript.

4. The computerized method of claim 3, wherein determining a relevance score of each historical issue in relation to each chunk comprises:
    extracting a n-gram from the each chunk, the n-gram being a contiguous sequence of n items from the chunk; and
    calculating the relevance score of each historical issue in relation to each chunk based on at least one of (1) matching between the n-gram extracted for the chunk and the historical issue, (2) an extent of the matching, (3) a weight of the chunk based on a position of the chunk in the incoming transcript, or (4) the legitimacy score corresponding to the historical issue.

5. The computerized method of claim 2, wherein the incoming transcript is generated from a call between a customer and an agent of the enterprise.

6. The computerized method of claim 1, wherein the text-based data includes clickstream data generated from customer queries with one or more websites of the enterprise.

7. The computerized method of claim 1, wherein extracting customer queries from the text-based data comprises identifying, for each historical customer interaction, at least one substring that includes one or more predefined keywords.

8. The computerized method of claim 1, wherein normalizing the customer queries comprises at least one of (i) collapsing white spaces in each customer query, (ii) removing one or more stop-words in each customer query, or (iii) applying a lemmatizer to each customer query.

9. The computerized method of claim 1, wherein filtering the customer queries comprise at least one of (i) removing queries with at least one of customer name or account information or (ii) removing queries with one or more misspelled words.

10. The computerized method of claim 1, wherein assigning the historical issues to one or more clusters comprises assigning the historical issues having two or more common words in different or same orders to a common cluster.

11. The computerized method of claim 1, wherein assigning the historical issues to one or more clusters comprises clustering the historical issues based on text similarity using an n-gram substring-match algorithm.

12. The computerized method of claim 1, further comprising periodically updating the set of historical issues based on additional text-based data related to new customer interactions.

13. A computerized system for automatically identifying a list of historical issues derived from historical customer interactions with an enterprise, the computerized system comprising:
    an extractor configured to receive text-based data corresponding to the historical customer interactions and extract customer queries from the text-based data;

a query normalizer, in electrical communication with the extractor, configured to normalize and filter the extracted customer queries to identify a set of historical issues of the customer queries, wherein each historical issue comprises a set of one or more unigrams;

a cluster generator, in electrical communication with the query normalizer, configured to (i) assign the historical issues to one or more clusters that capture and reduce variances among the historical issues, and (ii) determine a representative historical issue for each cluster of historical issues, wherein the historical issues in the corresponding cluster have tolerable degrees of variance from the representative historical issue;

a rank generator, in electrical communication with the cluster generator and the query normalizer, configured to generate a legitimacy score for each representative historical issue, each legitimacy score configured to evaluate at least one of presence of a question in the representative historical issue, presence of a verb in the representative historical issue, a number of tokens in the representative historical issue, or a number of occurrences of the representative historical issue in the text-based data; and an indexer configured to index the representative historical issues based on an importance score for each representative historical issue, wherein each importance score is an average of weights of the constituting unigrams in the corresponding representative historical issue, each importance score quantifying an importance of the corresponding historical issue based on the weights of the constituting unigrams, wherein the importance scores are used to match a new incoming transcript with one or more of the historical issues, and the legitimacy scores are used as a tie-breaker for selecting a historical issue from a plurality of matched historical issues that are most relevant to the new incoming transcript determined by iterating through the plurality of historical issues.

14. The computerized system of claim 13, further comprising an issue identifier configured to automatically identify one or more issues in an incoming transcript of unstructured text using the list of historical issues.

15. The computerized system of claim 14, wherein the issue identifier is configured to:
divide the incoming transcript of unstructured text into one or more chunks;
iterate through the list of historical issues to determine a relevance score of each historical issue in relation to each of the one or more chunks; and
select one or more of the historical issues with relevance scores greater than a predetermined threshold as the one or more issues associated with the incoming transcript.

16. The computerized system of claim 13, wherein the text-based data includes clickstream data generated from customer queries with one or more websites of the enterprise.

* * * * *